(12) United States Patent
Trainor

(10) Patent No.: US 10,633,121 B2
(45) Date of Patent: Apr. 28, 2020

(54) MAGNETIC SHIELD SYSTEM FOR SPACECRAFT, SPACE STATION AND PLANETARY HABITATION UNITS

(71) Applicant: Eamonn Patrick Trainor, Latham, NY (US)

(72) Inventor: Eamonn Patrick Trainor, Latham, NY (US)

( * ) Notice: Subject to any disclaimer, the term of this patent is extended or adjusted under 35 U.S.C. 154(b) by 418 days.

(21) Appl. No.: 15/680,315

(22) Filed: Aug. 18, 2017

(65) Prior Publication Data

US 2018/0370660 A1 Dec. 27, 2018

Related U.S. Application Data

(60) Provisional application No. 62/525,618, filed on Jun. 27, 2017.

(51) Int. Cl.
*B64G 1/54* (2006.01)

(52) U.S. Cl.
CPC ................... *B64G 1/546* (2013.01)

(58) Field of Classification Search
CPC ........... B64G 1/54; B64G 1/543; B64G 1/546
See application file for complete search history.

(56) References Cited

U.S. PATENT DOCUMENTS

| | | | |
|---|---|---|---|
| 7,464,901 B2* | 12/2008 | Kinstler | B64G 1/54 174/353 |
| 7,484,691 B2* | 2/2009 | Kinstler | B64G 1/54 244/171.7 |
| 8,550,406 B2 | 10/2013 | Bigelow | |
| 8,575,580 B1* | 11/2013 | Kinstler | B64G 1/54 250/515.1 |
| 8,740,154 B2 | 6/2014 | Bamford | |
| 8,809,824 B1* | 8/2014 | Kinstler | B64G 1/54 244/171.1 |
| 10,011,372 B2* | 7/2018 | Dong | B64G 1/12 |
| 2013/0037656 A1* | 2/2013 | Messano, Jr. | G21F 3/00 244/171.7 |
| 2018/0281995 A1* | 10/2018 | Williams | B64G 1/42 |

* cited by examiner

*Primary Examiner* — Philip J Bonzell
*Assistant Examiner* — Michael B. Kreiner

(57) ABSTRACT

A magnetic shield system for providing human occupants of spacecraft with protection from cosmic and solar radiation using electromagnets or solenoids for generating magnetic fields but which magnetic fields are kept at a sufficient distance from a spacecraft to greatly reduce the interference effect of the magnetic fields on the spacecraft electronic systems. The electromagnets or solenoids are placed at the ends of arms or shafts placed equidistantly from each other and projecting in uniform formation from the body of the spacecraft along the main axis or body of the spacecraft. The electromagnets or solenoids are placed parallel with each other and parallel with the main body of the spacecraft, are in-line with each other and are placed around the exterior of the spacecraft and along the main axis of the body of the spacecraft. Electromagnets may also be placed at the front and back of the spacecraft.

5 Claims, 4 Drawing Sheets

MAGNETIC SHIELD SYSTEM FOR SPACECRAFT, SPACE STATION AND PLANETARY HABITATION UNITS

CROSS-REFERENCE TO RELATED APPLICATIONS

This application claims the benefit of provisional patent application Ser. No. 62/525,618, filed 2017 Jun. 27 by the present inventor.

Federally Sponsored Research: None

Sequence Listing: None

BACKGROUND

Our planet, Earth, provides a natural magnetic field via a churning (most probably), molten iron core. This has enabled non-aqueous, non-subterranean organic life to live on the surface and thrive, protected from the deleterious effects of solar and cosmic radiation reaching the ground. Earth's magnetic field repels most cosmic and solar radiation from reaching the ground and causing damage to organic life living there, such as breaking up DNA or destroying organic cells. Earth's magnetic field lines have no palpable effect (other than on compasses) on electronics, such as are found on airplanes or on the ground, because Earth's field lines are so far away from the Earth's surface due to the size of the Earth compared to the human scale.

However, humans venturing out beyond low Earth orbit or through the Van Allen belts (areas of charged particles and ions trapped within Earth's magnetic field) are subjected to both solar and cosmic radiation. The exposure of the human body to this radiation is detrimental to long term health and could probably prove fatal either in the short or long term. The Apollo astronauts only went on journeys no longer than 12 days and were fortunate not to have been travelling during a solar storm or flare outburst, otherwise very high doses of radiation would have immersed the Apollo spacecraft. We need a way of protecting longer stay astronauts as they venture beyond low Earth orbit and outside of Earth's protective magnetic field.

U.S. Pat. No. 7,484,69162 uses a superconductor and solenoid to create a magnetic field around an area to be shielded from radiation and this is to occur within the body of the spacecraft. The superconductor is thermally controlled. Also, there is a second smaller magnetic shield device to deflect the main magnetic field from sensitive spacecraft areas. However, this still relies on a degree of complexity by having the magnetic field/s too close to the body of the spacecraft and requires the constant, unfailing working of the smaller magnetic field to constantly deflect the close in magnetic field lines.

U.S. Pat. No. 8,550,406 shows a single armature on the outside of a spacecraft used to maneuver an electromagnet in various directions on the outside of a spacecraft. This is to deflect radiation from one direction only to protect specific exterior parts and equipment of a spacecraft from radiation damage, such as solar cells and sensors. Hence the electromagnet is placed on the outside of the spacecraft to simply protect the exterior electronic equipment. Bigelow shows a limited magnetic field for intermittent use on a specific exterior portion of a spacecraft on an as needed basis depending on the direction of incoming charged particles and ions. It is not designed to protect human occupants of spacecraft, hence its limited operational use to a limited section of the exterior of a spacecraft. This patent is aimed at spacecraft in low Earth orbit, inside Earth's magnetic field lines, such as spacecraft at the orbital height of the International Space Station. Hence, it is only aimed at projecting a magnetic field in a specific direction when needed. It is a limited specific use apparatus, as it points out in the specification, and does not contemplate or intend to protect human beings. It is intended, most likely, for units in low Earth orbit, to protect the delicate sensors and equipment on the exterior of the unit only. It would not be viable outside Earth's protective magnetic field to protect human occupants on an ongoing and long stay basis and is not designed to carry out this function.

U.S. Pat. No. 8,740,154B2 relies on the creation of a shield magnetic shield that is irregularly perturbed by a source controller to increase its effectiveness and to avoid the need for creation of large magnetic field. This created shield magnetic shield is to protect electronic components on spacecraft that are vulnerable to radiation damage and does not create a magnetic field that encompasses the full spacecraft or specific portion, such as the habitation section. It is once again not directed at providing a magnetic shield to protect the human occupants of a spacecraft or space station.

There is a long felt but unresolved need for a way to protect human travelers venturing beyond the protective influence of Earth's magnetic field where they will be exposed to the unfiltered cosmic and solar radiation on an ongoing basis. Otherwise, human crews will start to suffer adverse and, most probably, irreversible health consequences that may become a danger to a space mission, even during the space mission, and/or will have lifelong ill-effects on the people causing symptoms akin to radiation sickness, leukemia and shortened life span. Crew affected by radiation over exposure during a space mission might not be able to maintain function of their spacecraft or will be too debilitated by the time they reach their destination. A way of counteracting this potentially space travel inhibiting scenario is now needed, especially since many space industry companies aim to venture out of low Earth orbit for considerable periods of time.

SUMMARY

This summary is provided to introduce a selection of concepts in a simplified form that are further disclosed in the detailed description of the invention. This summary is not intended to identify key or essential inventive concepts of the claimed subject matter, nor is it intended for determining the scope of the claimed subject matter.

There is a need for a structured, contained, adjustable, practical and effective way to create a uniform magnetic field surrounding the exterior sections of a spacecraft or space station that will protect the human habitation section or the entire spacecraft and also a need to create a magnetic field for habitation units on a planetary surface, such as Mars, which has a negligible magnetic field, as is the case with most planets in our solar system. Our home planet, Earth is a notable exception.

The best solution to providing protection against this solar and cosmic radiation is to use magnetic fields such as we have with Earth's magnetic field. Magnetic field lines are capable of deflecting and stopping the charged particles and ions that are components of solar and cosmic radiation. However, magnetic fields interfere with electronics if they come close enough to the electronics. For instance, you should not put a magnet on or near your computer processor. Of course, spacecraft are full of sensitive electronic equipment.

Solenoids are electromagnets that create very strong magnetic fields in their interior and the field lines associated with those magnetic fields expand away from the coiled wires around the ferromagnetic core or other core that can be magnetized. However, placing a solenoid near a spacecraft body will cause interference with the electronics of the spacecraft. This will therefore prove impractical for the operation of the spacecraft as the spacecraft computers/electronics will constantly be subject to the interference of the magnetic fields created by the electromagnets or solenoids.

Also, using only one electromagnet or solenoid, say aligned along the main body and line of motion of the spacecraft will leave the created north and south poles of the electromagnet or solenoid's magnetic field as entry points for radiation as the field lines will channel together to return to the poles allowing a path for radiation to travel into the interior of the spacecraft.

In one aspect of the disclosure an electromagnet or solenoid or several electromagnets or solenoids are placed at the non-spacecraft/space station end of arms or shafts projecting from the main body of the spacecraft/space station. A power source is provided to generate electrical current to be sent to the electromagnets or solenoids. Once the electromagnets or solenoids are electrically powered i.e. once electrical current starts to move through the coiled wires around their ferromagnetic or otherwise magnetizable cores, you create a strong magnetic field. The purpose of having the electromagnets or solenoids on arms or shafts projecting away from the spacecraft is to create magnetic fields sufficiently distant from the spacecraft so as to not interfere with any spacecraft electronics.

The arms or shafts are arranged in sets of two or more arms or shafts with electromagnets or solenoids at the non-spacecraft ends. Each set of arms or shafts are in line with each other equidistantly spaced about a 360 degree angle around one portion of the exterior of a spacecraft. Each set of arms or shafts are then placed in line with each other set of arms or shafts placed along the exterior portion of the spacecraft. This is, all arms of shafts from each set of arms or shafts should line up one with each other set of arms or shafts so that the electromagnets or solenoids are each in a direct line with each other corresponding electromagnet or solenoid placed at the end of the arms or shafts. Once the electromagnets or solenoids are powered on, the magnetic field lines created by the electromagnets or solenoids will then merge to form a continuous uniform magnetic field around the outside of the spacecraft or space station to repel cosmic or solar radiation away from the body of the spacecraft or space station. Other objects, features and advantages of the present invention will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description.

In one embodiment, the arms or shafts projecting from the body of the spacecraft have hinged joints disposed between the first end and the second end of each arm or shaft to allow for the retraction or expansion of the said arms or shafts towards or away from the body of the spacecraft. For instance, during a solar flare or other high radiation event, it may be necessary to pull the magnetic field lines together more closely by retracting the arms or shafts closer to the body of the spacecraft to create a stronger magnetic field around the spacecraft that will better withstand the increased push or charged particles and ions.

In one embodiment, electromagnets or solenoids are additionally placed at the front and back of the spacecraft in a perpendicular or lateral direction to the spacecraft line of motion. This would be to cover any gap left at the main north and south poles created by the uniform magnetic field around the spacecraft. If electromagnets or solenoids are placed laterally across or in front of the said north and south poles then the lateral magnetic field lines of those laterally placed electromagnets or solenoids will block radiation from being channeled down the north and south pole magnetic field lines.

Also, by having the electromagnets or solenoids placed equidistantly around the exterior surface of a spacecraft, you can allow for the entire spacecraft or a part of it to spin, perhaps to evenly distribute the Sun's heat around the entire exterior of the spacecraft or perhaps to generate artificial gravity within the spacecraft. In either scenario, regardless of the orientation of the spacecraft, there will be magnetic field lines protecting the entire outer surface.

In one embodiment, the magnetic fields need only surround the habitation units of a spacecraft to protect the human habitation sections and the electronic equipment around them. The magnetic fields need not surround the entire spacecraft but only those sections housing human inhabitants and the main electronic equipment. This can reduce the number of arms or shafts and electromagnets and solenoids and thereby reduce the costs of installing and maintaining these structures. For instance, if the spacecraft has an uninhabited fuel or engine section at the rear of the habituated section then the shielding due to structure and materials may offset the need for an electromagnet or solenoid generated magnetic field at the rear. Additionally, it may be possible to use radiation blocking materials at the front of the habitation section or front section of the spacecraft instead of a forward laterally placed electromagnet or solenoid to prevent cosmic or solar radiation entering the spacecraft via the magnetic pole formed at the front of the spacecraft.

However, it is also possible to have the magnetic fields cover the entire outside of the spacecraft or space station to additionally protect any sensitive electronics or other components that might be affected by solar or cosmic radiation.

In one aspect of the disclosure, for use by planetary surface habitation units, living quarters, perhaps dome shaped, or in the alternative in any chosen shape, will have an electromagnet or solenoid at the apex of each dome or alternatively shaped habitation unit which will provide magnetic field protection within the interior of each dome or surface habitation unit from the radiation coming down from the sky. This will avoid humans having to live under the ground of the Martian surface. Once again, each electromagnet or solenoid will have a power source that can be switched on or off.

REFERENCE NUMERALS

Figure 1:
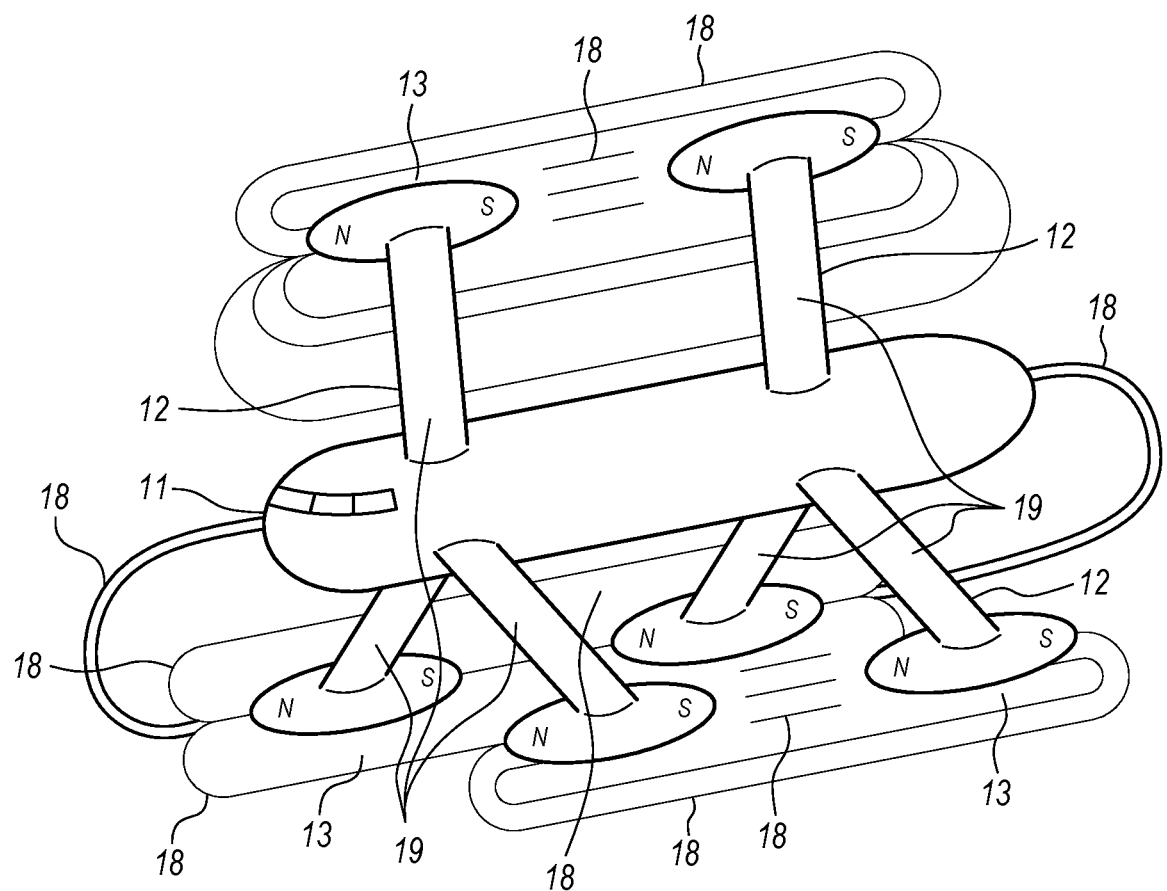
FIG. 1 is a perspective side view of a spacecraft with projecting arms or shafts extending from the body of the spacecraft with an electromagnet or solenoid at the end of each arm or shaft. Also shown are field lines created by the electromagnets or solenoids.

11 Spacecraft
12 Arm or shaft
13 Electromagnet or Solenoid (showing N=North magnetic pole, S=South magnetic pole)
14 Lateral Electromagnet or solenoid
15 Hinged joint in an arm or shaft
16 Planetary surface habitation unit
17 Planetary surface
18 Magnetic field lines or magnetic field
19 Set of arms or shafts

DETAILED DESCRIPTION OF EMBODIMENTS

The present invention generally relates to providing a magnetic shield around a spacecraft to deflect cosmic and solar radiation away from the spacecraft and thereby protect the human occupants of the spacecraft from radiation exposure.

A description of embodiments of the present invention will now be given with reference to the Figures. It is expected that the present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

This invention provides overlapping magnetic fields 18 at a distance from the spacecraft to shield the human occupants of the spacecraft from cosmic and solar radiation but to not cause interference with the electronics on board the spacecraft or space station. Overlapping magnetic fields 18 are created by equally spaced sets 19 of electromagnets or solenoids 13 on arms or shafts 12 along the exterior length of a spacecraft 11 with additional electromagnets or solenoids 13 at the front and back of the spacecraft, as needed. Each individual set 19 of electromagnets or solenoids 13 on arms or shafts, for instance each set of three or four arms or shafts 12 with electromagnets or solenoids 13 at their non-spacecraft ends are placed in an in-line circle around the body of the spacecraft 11, and are aligned with each other set 19 of arms or shafts 12 with electromagnets or solenoids 13 at their non-spacecraft ends along the exterior body of the spacecraft 11 to create an in-line uniformity of all arms or shafts 12, as seen along the main axis of the spacecraft 11, each containing corresponding electromagnets and solenoids 13 at their ends or as viewed from any other axis. This is to create the strongest magnetic field line 18 continuity along the length of the spacecraft 11 or however needed for portions of the spacecraft 11 only. Each set 19 of arms or shafts 12, for instance each set 19 of three or four projecting arms or shafts 12 that are in line with each other around the exterior body of the spacecraft, are placed sufficiently close to each other set of arms or shafts 12 with the electromagnets or solenoids 13 at their ends so as to create magnetic field lines 18, that join together to form continuous uniform field lines 18 running the entire distance between all the sets 19 of electromagnets or solenoids 13. Field lines 18 created by electromagnets 13 or other magnets will always travel from North Magnetic Pole to South Magnetic Pole and will also take the shortest distance to travel that path if possible unless prevented by other magnetic field lines 18, in which case they will travel to the next available South Magnetic Pole. Using this principle, the magnetic field lines can be channeled to provide a comprehensive coverage. By having the magnetic fields 18 overlap and form a continuous uniform magnetic field 18, you create a continuous line shell of protection for all parts of the spacecraft 11 from incoming cosmic and solar radiation. Any gaps in this protective shell would allow radiation to enter the spacecraft causing health hazards for the human occupants.

Electromagnets or solenoids 13 with coil windings create the strongest magnetic fields 18 and these magnetic fields 18 can be turned on and off as an electromagnet. For instance, when the spacecraft lands on a planetary surface 17, there may be no further need for the presence of a magnetic field 18.

FIG. 1 is a perspective view of one embodiment taken from the side ¾ angle of a spacecraft 11 with two sets 19 of arms or shafts 12 projecting from the main body of the spacecraft 11. Each of these arms or shafts 12, within each set 19 of arms or shafts, can be placed at any chosen equidistant angle from each other, say, 90 degrees apart from each other with the arms or shafts 12 in an in-line circle configuration around the exterior of the spacecraft 11. Alternatively, the angles between each of the in-line arms or shafts 12 may be greater than 90 degrees, for instance, 120 degrees apart or some other degree of separation, within each set 19 of arms or shafts 12. For instance, the arms or shafts 12 can be set at smaller angles of separation from each other, within each set 19 of arms or shafts 12, if needed to complete the sufficiently strong overlapping of the magnetic fields 18 created by the electromagnets or solenoids 13 around the full exterior 360 degrees of the body of the spacecraft 11 at the section of the spacecraft 11 where an individual set of arms or shafts is placed. There can be several sets 19 of arms or shafts 12 along the body of the spacecraft 11 to provide continued full force magnetic field 18 protection along a longer surface area. The distance between each set of arms or shafts 19 is determined by what distance is feasible to create a continuous uniform magnetic field along the length of the spacecraft 11. Each set 19 of arms or shafts 12 should be in line with each other set of arms or shafts 19 i.e. the individual arms or shafts 12 with electromagnets or solenoids 13 at their ends, should all line up so that if you look along the main axis of the spacecraft 11 there is common or in-line alignment of all arms or shafts 12 and electromagnets or solenoids 13. This is to create stable and uniform magnetic fields 18 around the spacecraft 11.

Figure 2:
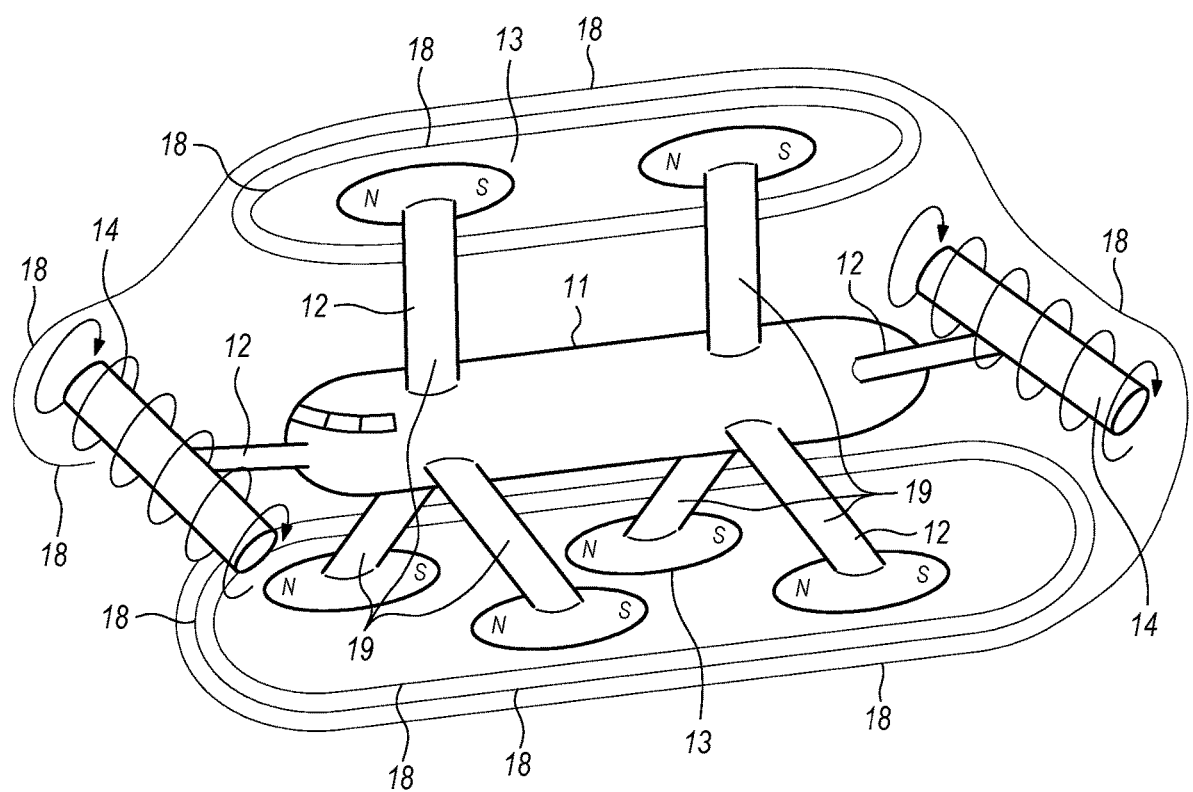
FIG. 2 is a perspective side view of a spacecraft with arms or shafts projecting from the body of the spacecraft with an electromagnet or solenoid at the end of each arm or shaft and additional arms or shafts projecting from the front and back of the spacecraft each with an electromagnet or solenoid placed laterally to the direction of motion of the spacecraft at the end of each arm or shaft. Also shown are field lines created by the electromagnets or solenoids.

FIG. 2 shows one embodiment with electromagnets or solenoids 14 which are placed laterally to the line of motion of the spacecraft at both the front and back of the spacecraft 11 according to its line of motion and which create magnetic field lines 18 perpendicular to the line of motion of the spacecraft 11. That is, electromagnets or solenoids 13 placed at the front and back of the habitation units of the spacecraft or the entire spacecraft 11 in a perpendicular or lateral direction to the spacecraft's line of motion and perpendicular to magnetic field lines 18 created along the length or main axis of the spacecraft 11. This would be an additional measure if necessary to prevent incoming cosmic or solar radiation from coming down any gaps in the north-south magnetic field lines 18 created by the electromagnets or solenoids 13 placed on the side or sides of the spacecraft 11. These gaps in otherwise magnetic field line 18 uniformity would otherwise let charges ions and particles be channeled into the interior of the spacecraft 11 along the main axis of the spacecraft 11 via its line of motion.

In one embodiment, there should be a set of arms or shafts 12 ideally placed near the front of the spacecraft 11 and one set of arms or shafts 12 placed near the back of the spacecraft 11 to join up field lines 18 created by the electromagnets or solenoids 13 on the sets of arms or shafts 12 placed along the length or main body of the spacecraft 11 with the field lines 18 created by the laterally/perpendicularly placed electromagnets or solenoids 13 at the front and back of the spacecraft 11. This would help provide continuous magnetic field 18 coverage for the ends of the spacecraft 11 as determined by the line of motion of the spacecraft 11.

In one embodiment, the projecting arms or shafts 12 with electromagnets or solenoids 13 at their ends need only be placed around habitation units on spacecraft 11 to protect the human habitants. The rest of the spacecraft 11 e.g. fuel sections, engine etc. need not have this protection as these parts will not contain any living inhabitants.

Mu metals or other magnetic field line 18 channeling materials can be used as alloys on the outer surface of the spacecraft 11 to help channel any field lines 18 that may reach closer into the main shell or body of the spacecraft 11 and thereby channel those encroaching magnetic field lines 18 away from overlapping into the interior of the spacecraft 11.

Figure 3A:
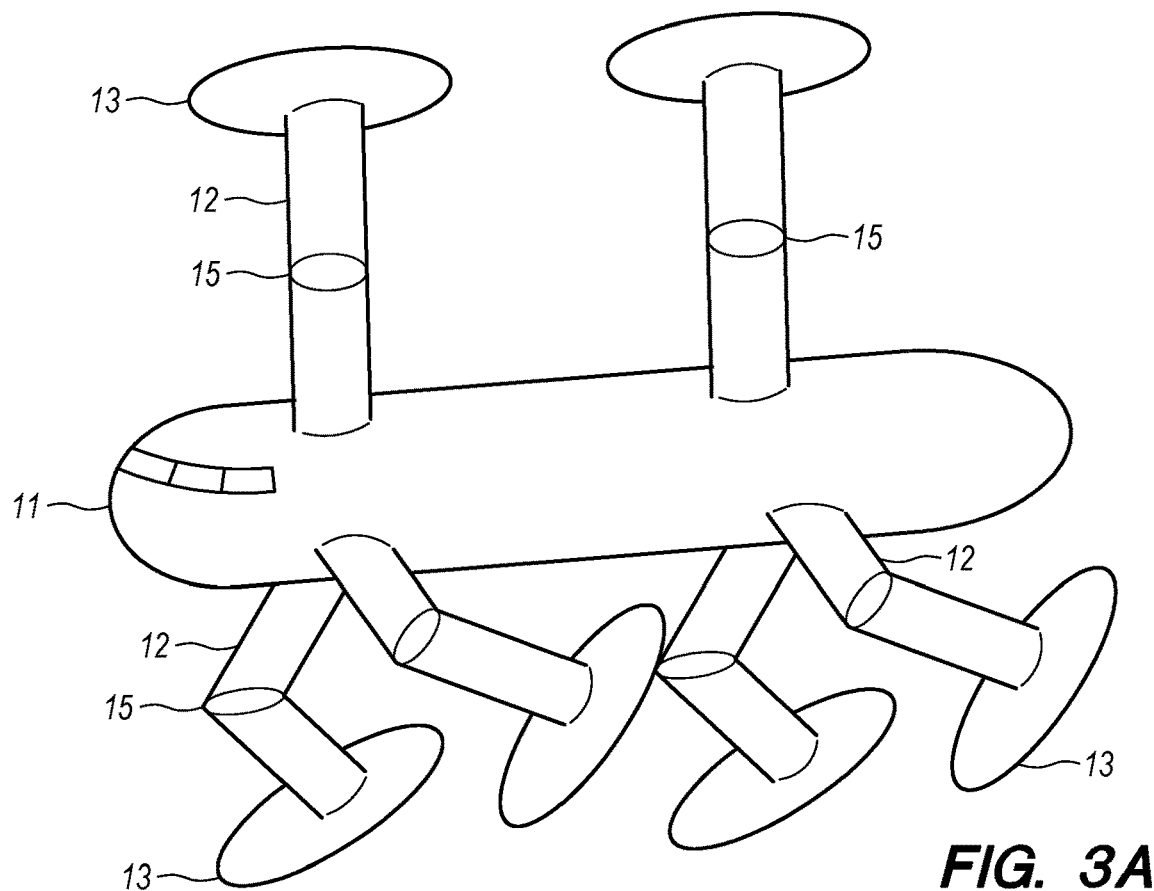
FIG. 3a is a perspective side view of a spacecraft showing arms or shafts projecting from the body of the spacecraft each with an electromagnet or solenoid at the end of the arms or shafts and hinged joints along the arms or shafts to allow for retraction or expansion of the arms or shafts in towards the body of the spacecraft or away from the body of the spacecraft. 3b shows an arm or shaft with two hinge joints that is in the process of retracting or expanding. 3c shows an arm or shaft projecting from the side of a spacecraft containing a hinged joint.
Figure 3B:
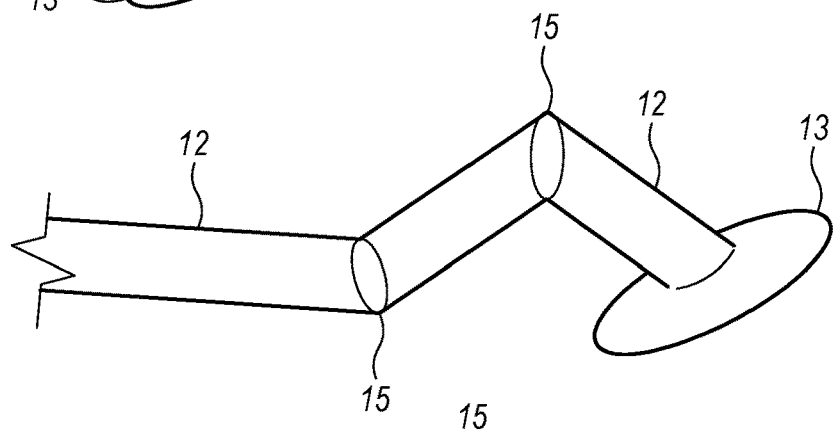
Figure 3C:
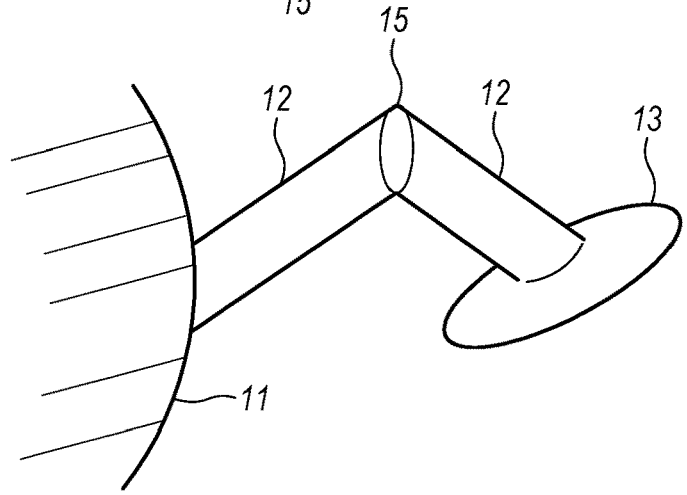

FIG. 3a is a perspective view of one embodiment of this invention, with arms or shafts 12 that are retractable into and out from the main body of the spacecraft 11. The arms or shafts 12 have hinged joints 15 that can bend or allow the arms or shafts 12 to unfurl like solar panels on some spacecraft today. FIG. 3b shows one arm or shaft 12 with two hinged joints 15. FIG. 3c shows an arm or shaft with one hinged joint 15 projecting from the side of a spacecraft 11. This may be necessary when the spacecraft lands on a planetary surface or docks with another spacecraft or space station and in such cases, the electromagnets or solenoids can optionally be unpowered to prevent interference with spacecraft electronics. By having retractable arms or shafts 12, it will be possible to allow the electromagnets or solenoids 13 to be brought closer to the main body of the spacecraft 11 and bring the magnetic field lines 18 produced by powered electromagnets or solenoids 13 in a more concentrated fashion closer to the spacecraft 11 in case of high radiation bursts from stars, such as our Sun. A solar radiation blast will naturally push back magnetic field lines 18 and it may be necessary to strengthen the resistance of the magnetic field lines 18 by bringing them closer together. The arms or shafts 12 could also be used to house spacecraft engines along their length (much like an aircraft) so that if an engine blows up then the rest of the spacecraft 11 is relatively immune from additional damage.

In one embodiment of the invention a smaller magnetic field at the main body of the spacecraft may be used to repel encroaching field lines 18 from the bigger magnetic fields created by the electromagnets or solenoids 13 at the end of the arms or shafts 12 and more importantly to dispel any trapped radiation contained within magnetic field lines 18, created by the electromagnets or solenoids 13 at the ends of the arms or shafts 12 projecting from the body of the spacecraft 11, from heading towards the spacecraft 11 when the electromagnets or solenoids 13 at the end of the arms or shafts 12 are turned off. This trapping of charged particles and ions occurs in nature with the Van Allen belts around the Earth which contain trapped charged particles and ions from solar and cosmic radiation within the magnetic field lines of the Earth. The use of electromagnets or solenoids 13 on arms or shafts 12 can also be used the same way, as outlined in this description, on space stations, which are another form of spacecraft.

Figure 4:
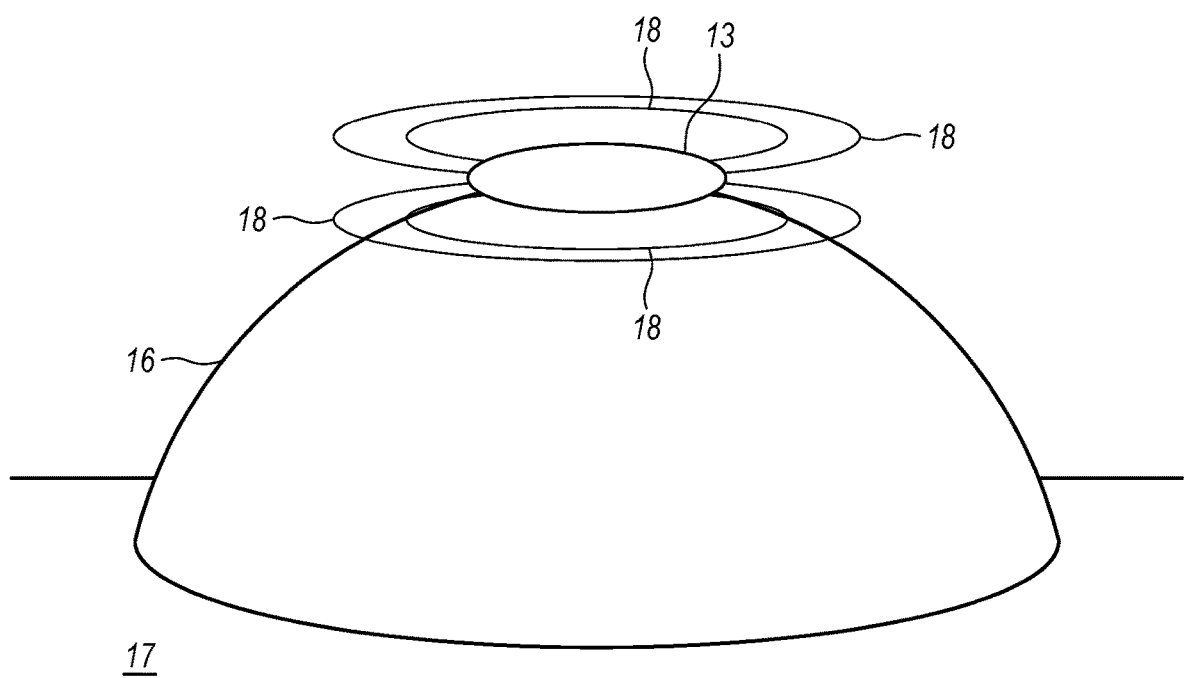
FIG. 4 is a perspective view of a planetary surface habitation unit with an electromagnet or solenoid at the apex or upper elevation of the habitation unit, which is shown as dome shaped in this drawing.

FIG. 4 For the surface of a planet 17, such as Mars, it is anticipated that dome shaped structures 16 may be used for habitation units, or other desirable differently shaped structures, and these will have an electromagnet or solenoid 13 at the apex or top of each dome or alternatively shaped structure 16 to provide a magnetic field 18 there to help stop radiation from getting into the inside of the dome or other shaped structure 16. Radiation will come from the sky and needs to be intercepted before entering any surface units inhabited by humans. Alternatively, habitation units on planetary surfaces 17 can take any shape or form and the use of a powered electromagnet or solenoid 13 at the upper portion of any such habitation units will provide the same radiation protection as just outlined for dome shaped units.

The foregoing examples have been provided merely for the purpose of explanation and are in no way to be construed as limiting of the present concept disclosed herein. While the concept has been described with reference to various embodiments, it is understood that the words, which have been used herein, are words of description and illustration, rather than words of limitation. Further, although the concept has been described herein with reference to particular means, materials, and embodiments, the concept is not intended to be limited to the particulars disclosed herein; rather, the concept extends to all functionally equivalent structures, methods and uses, such as are within the scope of the appended claims. Those skilled in the art, having the benefit of the teachings of this specification, may affect numerous modifications thereto and changes may be made without departing from the scope and spirit of the concept in its aspects.

What is claimed is:

1. A magnetic shield system, comprising:
   arms or shafts having a first end and a second end, the first end of each arm or shaft is adapted for being connected to the body of a spacecraft, wherein the arms or shafts have hinged joints disposed between the first end and the second end to allow for the retraction or expansion of the said arms or shafts towards or away from the body of the spacecraft,
   an electromagnet or solenoid is connected to the second end of each arm or shaft projecting from the spacecraft, a power source powering the electromagnet or solenoid, and
   which electromagnets or solenoids create magnetic fields when electrically charged, and which magnetic fields will merge together to create a continuous uniform magnetic field around the outside of the spacecraft to repel cosmic and solar radiation from reaching the body of the spacecraft.

2. The spacecraft magnetic shield system of claim 1 wherein the arms or shafts, each with an electromagnet or solenoid placed at the non-spacecraft end, are arranged in sets of two or more arms and shafts placed in line with each other around one portion of the body of a spacecraft.

3. The spacecraft magnetic shield system of claim 2 wherein each set of arms or shafts with electromagnets or solenoids are placed in formation with each other set of arms or shafts along the body of the spacecraft so that all arms and shafts line up when viewed at any axis.

4. The spacecraft magnetic shield system of claim 1 wherein electromagnets or solenoids are additionally placed at the front and back of the spacecraft in a perpendicular or lateral direction to the spacecraft line of motion.

5. The spacecraft magnetic shield system of claim 1 wherein there is a switch to turn off or turn on the flow of electricity to the electromagnets or solenoids.

* * * * *